United States Patent

Pace

[19]

[11] Patent Number: 6,061,656
[45] Date of Patent: *May 9, 2000

[54] COMPUTER-BASED TRADING CARD SYSTEM AND METHOD

[76] Inventor: Michael Pace, c/o EMA Multimedia, Inc. 11911 San Vicente Blvd., Suite 230, Bretwood, Calif. 90049

[*] Notice: This patent is subject to a terminal disclaimer.

[21] Appl. No.: 08/971,330

[22] Filed: Nov. 17, 1997

Related U.S. Application Data

[63] Continuation-in-part of application No. 08/540,209, Oct. 6, 1995, Pat. No. 5,689,561.

[51] Int. Cl.⁷ .................................................... H04K 1/00
[52] U.S. Cl. .................... 705/1; 705/1; 380/4; 380/24; 380/25; 380/21; 395/186; 395/187; 463/1; 463/2; 463/29; 463/43
[58] Field of Search ........................... 705/1; 380/4, 24, 380/25; 395/186, 187; 463/1, 2, 29, 43

[56] References Cited

U.S. PATENT DOCUMENTS

| | | |
|---|---|---|
| 4,634,807 | 1/1987 | Chorley et al. . |
| 4,905,280 | 2/1990 | Wiedmer . |
| 5,109,413 | 4/1992 | Comerford et al. . |
| 5,112,051 | 5/1992 | Darling et al. . |
| 5,237,610 | 8/1993 | Gammie et al. . |
| 5,273,288 | 12/1993 | Teshima et al. . |
| 5,319,705 | 6/1994 | Halter et al. . |
| 5,343,524 | 8/1994 | Mu et al. . |
| 5,343,527 | 8/1994 | Moore . |
| 5,379,433 | 1/1995 | Yamagishi . |
| 5,411,258 | 5/1995 | Wilson et al. . |
| 5,411,259 | 5/1995 | Pearson et al. . |
| 5,412,717 | 5/1995 | Fischer . |
| 5,412,718 | 5/1995 | Narasimhalu et al. . |
| 5,416,840 | 5/1995 | Cane et al. . |
| 5,437,464 | 8/1995 | Terasima et al. . |
| 5,440,631 | 8/1995 | Akiyama et al. . |
| 5,442,706 | 8/1995 | Kung . |
| 5,533,124 | 7/1996 | Smith et al. . |
| 5,689,561 | 11/1997 | Pace ............................................. 380/4 |

*Primary Examiner*—James P. Trammell
*Assistant Examiner*—Nga B. Nguyen
*Attorney, Agent, or Firm*—Oppenheimer Wolff & Donnelly LLP

[57] ABSTRACT

A collection system using a computer or smart device system wherein the collection items (or more specifically their unlocking keys) are contained in various floppy disks and/or an optical storage drive and/or are obtainable through a network connection. With the collection items in the computer or smart device system, the icons of the collection items appear on the computer monitor or other display. By (double) clicking on or otherwise selecting the icon, the unlocking key unlocks the corresponding collection item in the program into the hard drive and at the same time the unlocking key is rendered inoperative. A generally reverse process can be used to lock the collection item relative to the hard drive and render the unlocking key operative. The user collects the collection items by unlocking, for example using a number of floppy disks, the locks in his/her program, which contains the corresponding locks for all of the collection items in the set. When the entire set or a predetermined subset thereof has been collected, the program allows the user to play an interactive game related to the collection items. The user can also enjoy a video and/or audio presentation contained in the disk and/or the program and/or off the Internet associated with each of the keys (and thereby the corresponding collection items), the collection items themselves or the game by appropriate selection. That is, instead of the prior art system of trading paper cards or the like, the user herein trades the digital files, the floppy disks or the portable optical storage discs to collect the collection items and games, and advantageously can enjoy audio/visual presentations and interactive computer games also associated with the collected items.

34 Claims, 7 Drawing Sheets

COMPUTER-BASED TRADING CARD SYSTEM AND METHOD

CROSS-REFERENCE TO RELATED APPLICATION

This is a continuation-in-part of application Ser. No. 08/540,209, filed Oct. 6, 1995, now U.S. Pat. No. 5,689,561, and whose entire contents are hereby incorporated by reference.

BACKGROUND OF THE INVENTION

Through the years, people and especially children have enjoyed collecting various things as a game, a hobby, a competition, a lesson or for other reasons. In early times they collected stones, animal or plant parts or other things found in nature. Later it was also manufactured items such as marbles, toys, memorabilia, coins or stamps. More recently, collecting WACKY PACKS (cult stickers with humorous (sometimes ghoulish humor) corrupted pictures of common trademarked products) and POGS (a bottle cap type of game) have been popular. Over the past hundred or so years and continuing today, trading card collecting has been extremely popular and the more popular of them have been baseball trading cards sold in packs or in a package with another product typically bubble gum. The cards each have a baseball player pictured thereon with his playing statistics and a brief write-up on him. The collector, typically children, would seek to collect a desired set of cards, which could be all of the players on a certain team, his/her favorite players, or the more rare and desired and thus valuable cards. In fact, some cards are so desirable that they have sold for many tens of thousands of dollars.

To obtain the desired cards the collector can purchase them from the original source if still available and/or can trade his/her less desirable cards with other collectors for his/her desired cards. The negotiating and interactions with other collectors is a big attraction to the collection activity. While in the past and typically now the trading takes place informally with just two or a few people gathered together, large trading conventions attracting tens of thousands of people have been held to attempt to satisfy the growing trading interest, needs and demands. In other words, people are continually looking for different items to collect, and different more entertaining ways of trading and collecting, and this invention is directed to at least partially satisfying those needs.

SUMMARY OF THE INVENTION

Disclosed herein is a computer-based collection and trading system, providing a unique and flexible system for trading, displaying and enjoying collectible items. Instead of being contained on paper trading cards (or stamps or the like) as often found in the prior art, the collectible items of the present invention are contained on standard 3½" floppy disks or optical storage media discs or stored on an Internet server and accessible (downloadable) from the Worldwide Web, and the children (or adults) then trade the floppies (or disks) themselves instead of the paper cards. To view the collectible items on a floppy, and each floppy would typically have one or more and preferably six items therein, the floppy is inserted into a compatible personal computer and the floppy program run. To view collectible items on the Worldwide Web, the appropriate website would be accessed using a Web browser and the chosen items downloaded to the user's personal computer. For each collectible item, an associated audio/visual display on the computer would be available to be accessed and enjoyed if desired.

The collectible items can be "transferred" from the floppies or from the Web to a portable optical storage medium (such as a CD ROM/DVD ROM) program on that computer for further display, collecting and interactive game playing. The program is like an album for the cards, providing a neat, organized and enjoyable method of storing and retrieving the cards and accompanying software. The game playing is preferably possible only after the entire set of collectible items or one or more predetermined subsets thereof have been collected, using the program. This provides a greater incentive to collect the entire set.

The collectible items are individually "transferred" from the floppies or the Web to the hard drive using a system of encryption/decryption algorithms. When transferred from a floppy, the item is disabled from that floppy so that the floppy cannot be used again to transfer that item to another computer system (unless the item has been transferred back to it from the hard drive). The item can be transferred from the hard drive only to that floppy (or a similar disabled floppy having that algorithm), as when the user wants to trade the item on the floppy to another collector. As each collectible key or code is located on a floppy, it is selected by the user, locked and dimmed on that floppy, its key code updated to a preferences file on the host computer system and then unlocked on the companion collection program. That is, the key has been dimmed from use on the floppy and lit on the optical storage medium via the computer system. All remaining keys remain intact on the floppy disk, available for trading to another collector. Once all the cards in a particular series are collected (unlocked from the optical storage medium to the hard drive), an interactive game is decrypted for the collector-user to play and enjoy.

As further protection and deterrence against unauthorized copying, each floppy disk case includes affixed thereon a unique hologram and a unique serial number.

Other objects and advantages of the present invention will become more apparent to those persons having ordinary skill in the art to which the present invention pertains from the foregoing description taken in conjunction with the accompanying drawings.

DETAILED DESCRIPTION OF PREFERRED EMBODIMENTS OF THE INVENTION

The present invention can be incorporated in portable optical storage systems such as CD ROM and DVD ROM. Aside from DVD ROM, other optical R/W media can be used, as well as various incarnations of DVD including DIVEX. Another embodiment includes interaction with content housed on a Website which contains additional collectible items and/or enhancements to items contained on the floppies or optical storage discs.

Digital video disc or DVD is a video distribution medium for digital video that has superior audio and video quality, interactivity and distribution control. DVD is a new medium for the distribution of from 4.7 to 17 billion bytes of digital data on a 120-mm (4.75 inch) disc. This huge volume of data (today's CD can store 680 million bytes of data) can be used to store up to nine hours of broadcast quality video and multi-channel surround-sound audio, highly interactive multimedia computer programs, thirty hours of CD-quality audio, or anything else that can be represented as digital data. A DVD looks like today's CD; it is a silvery platter, 4.75 inches in diameter, with a hole in the center. Like a CD, data is recorded on the disc in a spiral trail of tiny pits, and the discs are read using a laser beam. The DVD's larger capacity is achieved by making the pits smaller and the spiral tighter, and by recording the data in as many as four layers, two on each side of the disc.

In other words, DVDs can store up to 17 billion bytes of data on a 120-mm (4.75 inch) platter. That is enough data for up to nine hours of broadcast quality audio and video. The digital nature of this new media offers options unknown in the analog world, including interactivity, simultaneous multiple language support, parental control, multiple camera angles, and pay-per-view. The video and audio quality delivered by this medium, based on MPEG-2 digital video and Dolby AC3 or MPEG-2 digital audio, is the best ever available to consumers. Other digital video delivery systems, including direct broadcast satellite, wireless cable and digital cable, use the same digital video technology as DVD. Consequently, one or more of these applications may "converge" with the DVD player.

Nearly all personal computers are sold with a CD-ROM drive. When CD-ROM was first proposed in 1986, 680 Mbytes was many times the capacity of a typical hard disk drive, and there were no programs that would completely fill a CD. This is no longer true. Many personal computers come with disk drives that hold over a gigabyte of data, and many games with multimedia content are too big to fit on a single CD.

Consequently, personal computer makers are looking forward to putting DVD-ROM drives into PCs, and when they do so, adding a DVD video decoder is all that is necessary to bring DVD's excellent video and audio to the PC for entertainment, games, education, training and promotional applications.

Movie content owners are concerned about DVD movie playback on the PC. If the decryption of the movie data is done by the computer's central processor, then decrypted data could be stored on one of those large hard disk drives that many PCs possess. Once there, the data could be easily copied on to another media. Three schemes have been proposed to prevent copying as discussed below.

(1) Eliminate the "Save As" function from "Movie Player" applications. This scheme is simple to implement, but not too difficult to circumvent. Some Hollywood studios want stronger safeguards.

(2) Modify the computer's basic operating system such that it will recognize DVD data and prevent copying by any application running on the computer. All of the major and many of the independent film studios approve of this scheme, but modifying operating systems is not trivial. "Windows 97" will purportedly implement this feature sometime in 1998.

Figure 7:
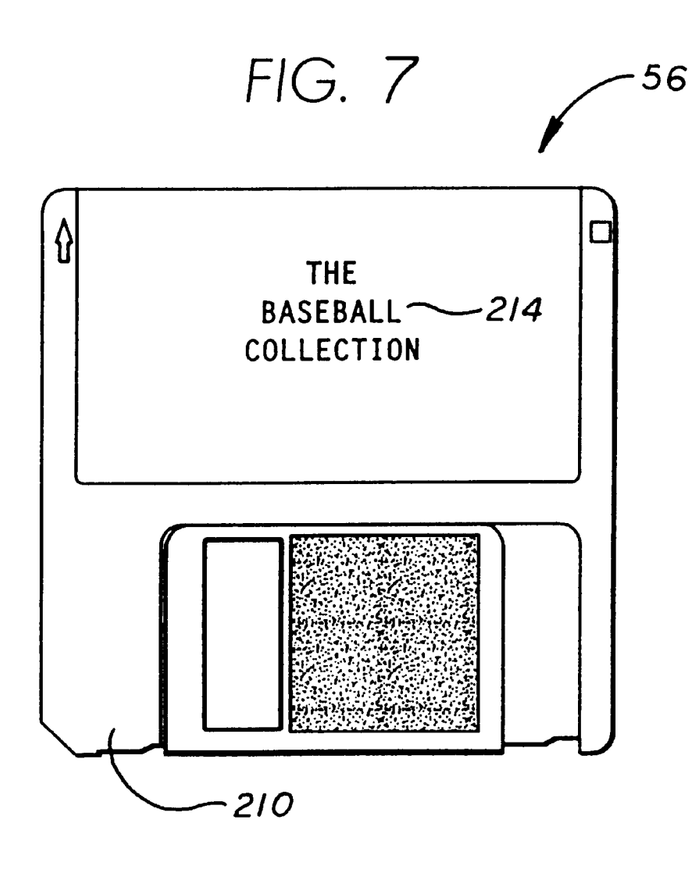
FIG. 7 is a front view of one of the floppy disks of the system of FIG. 1, shown enlarged and in isolation.

(3) Arrange the computer hardware such that the DVD data never flows over the main bus (PCI Bus), which prevents it from being decrypted by the CPU and recorded on a hard disk or tape. As will be discussed later, FIG. 7 is a block diagram of such a PC, which shows the relationship of the subsystems. In addition to making copying difficult, this system is potentially the most efficient, keeping both compressed and uncompressed audio and video data from overloading the PC's main bus.

While a DVD system has been discussed above, the present invention can be embodied in any form of optical storage.

Figure 1:
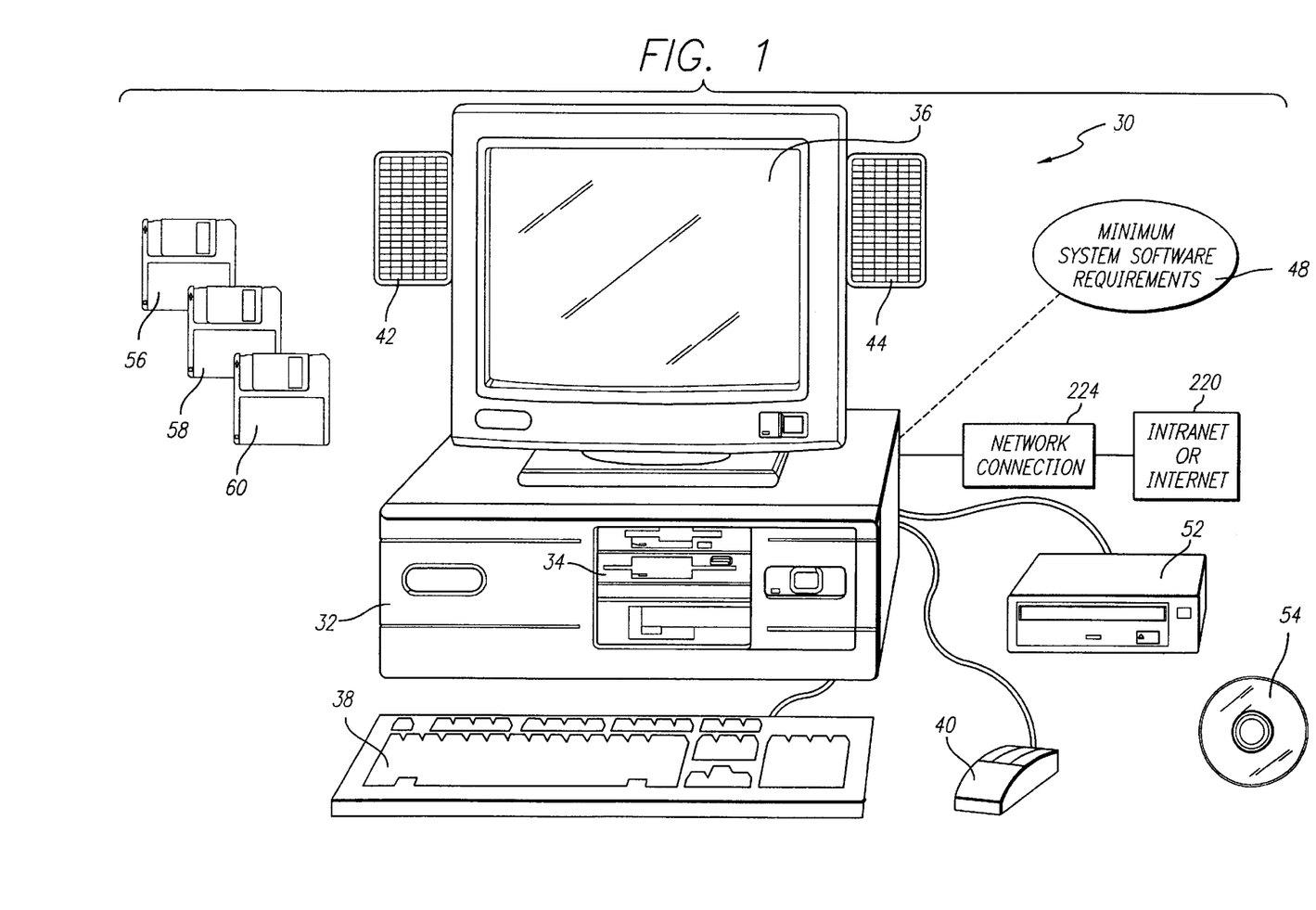
FIG. 1 is a schematic diagram of equipment used in a computer-based collection system of the present invention.

Computer equipment of a system of the present invention is shown generally at 30 in FIG. 1. The equipment includes a computer hard drive 32, a floppy disc drive 34, a display monitor 36, a keyboard 38, a mouse 40 and speakers 42, 44. The minimum equipment specifications and system software requirements 48 are MPC Level 2 or higher or MAC 68040 or higher. The requirements are itemized in detail later in this disclosure. Also, periodically throughout this disclosure prior art patents are referenced, and each of their entire disclosures is incorporated herein by reference.

A portable optical storage disc containing a program of this invention is installed in the optical storage drive 52 in a known manner. The collection items and associated programs to interact with the program are played and installed into the hard drive 32 by using floppy disks inserted individually into the disk drive 34. More than one floppy disk is preferably needed for this system, and three are pictured in FIG. 1 at 56, 58, 60.

The portable optical storage program includes all of the collectible items in the set of collectible items. However, they are all "locked" and cannot be accessed and unlocked into the hard drive 32 unless the unlocking "keys" are accessed and used. A separate key is provided for each of the locked items, and the keys are provided on the floppy disks 56, 58, 60. The number of items in the set of collectible items will be at least two and preferably and more likely many tens or hundreds, depending on the program. Each floppy disk 56, 58, 60 will have at least one key and more likely a plurality of keys such as six keys.

Although there can be floppies having identical keys, most floppies will have different groups of keys. For example, floppy 56 can have keys A, B, C, D, E and F (for corresponding collection items), floppy 58 can have keys D, E, F, G, H and I, and floppy 60 can have keys B, C, D, G, H and I. In this brief example, key A appearing on only one floppy may be the most valuable and thus most tradable and key D appearing on all three floppies may be the least valuable. The portable optical storage program game (to be discussed later) may make certain keys more valuable even if more common due to the use of the corresponding item in the game. Also, certain keys may be more valuable because of the desirability of the associated item.

Figure 2:
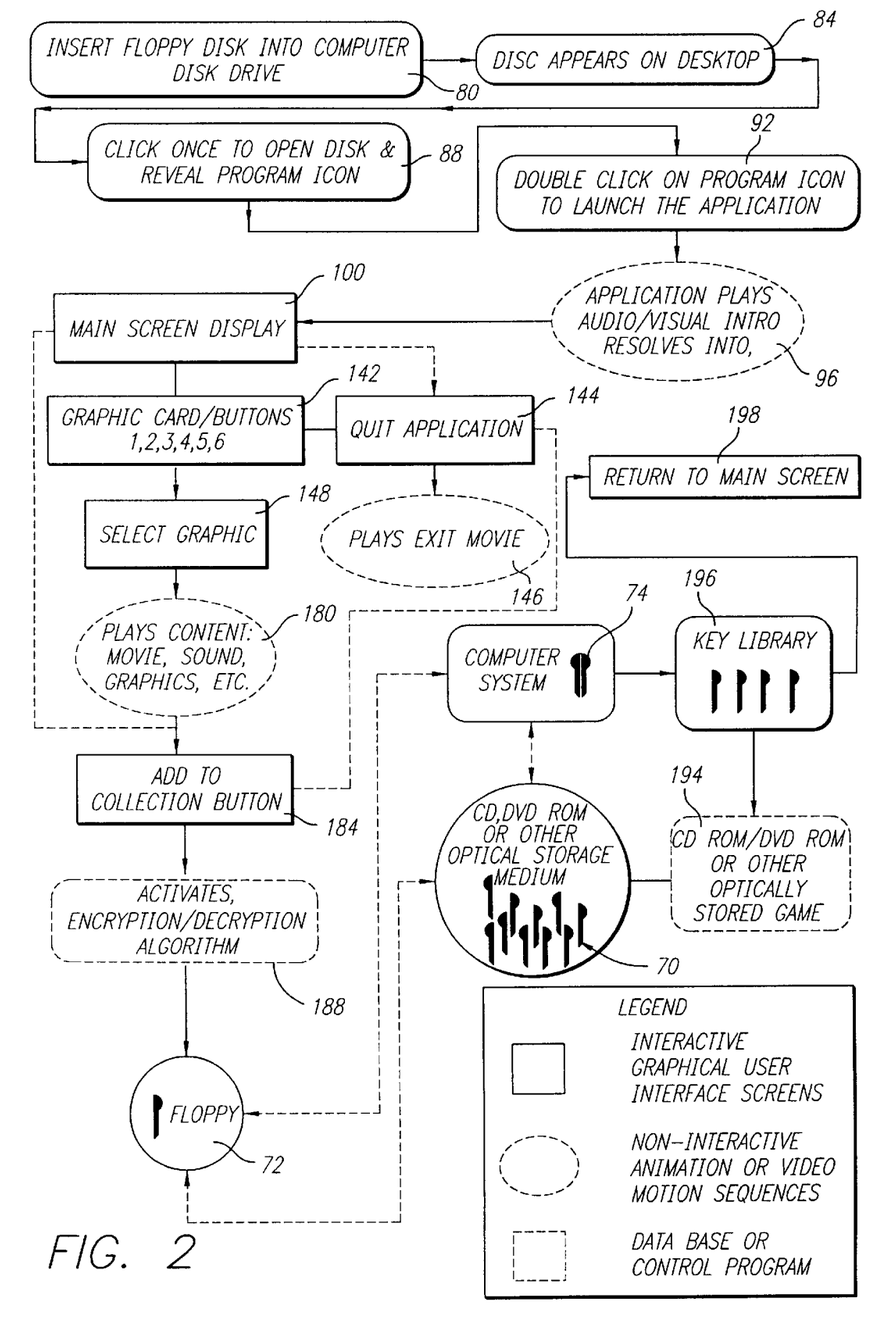
FIG. 2 is a flow chart of a collection system and method of the present invention using the equipment of FIG. 1.
Figure 3:
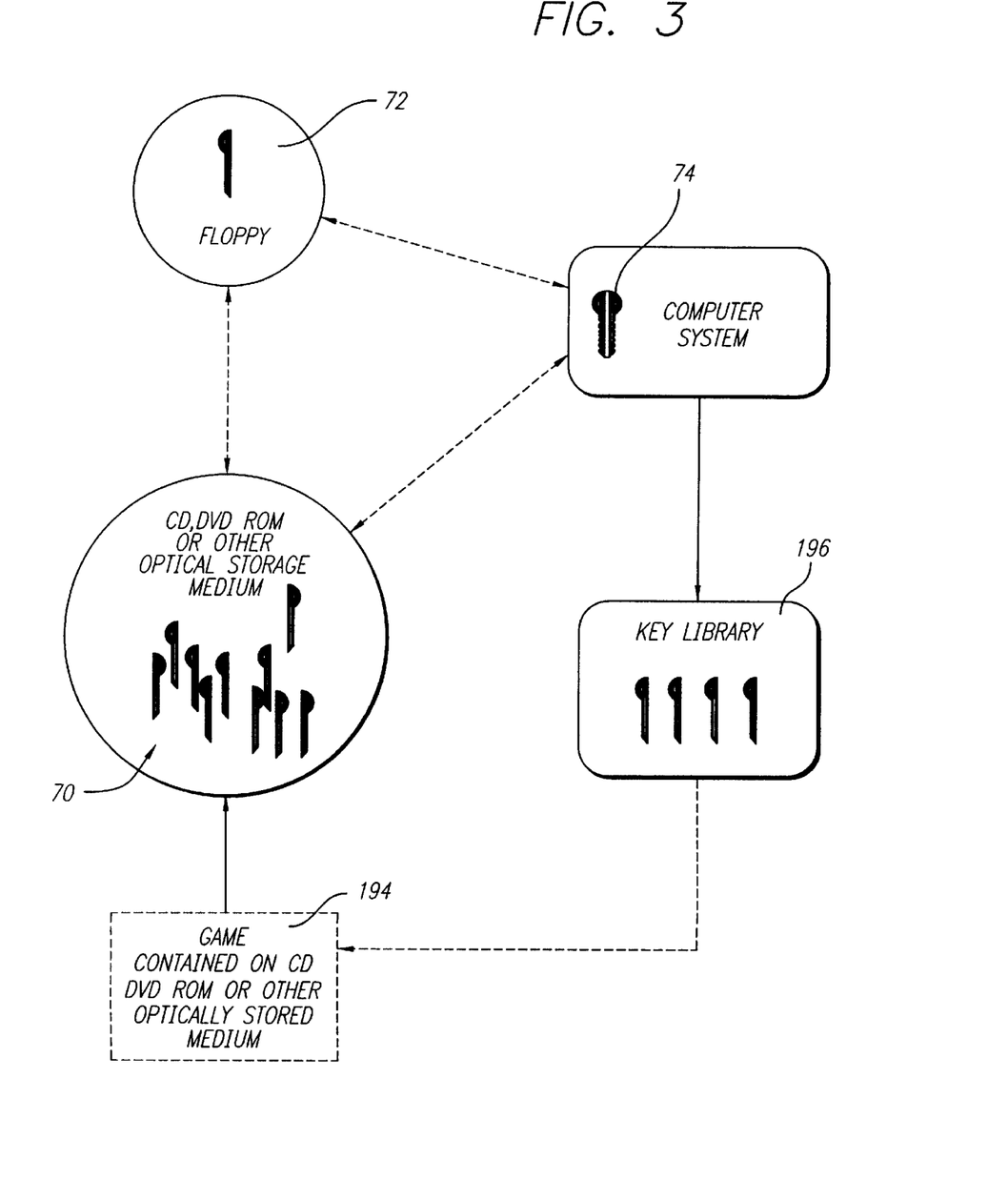
FIG. 3 is an enlarged view of the lower left portion of the flow chart of FIG. 2.

The "keys" on the floppy discs 56, 58, 60 unlock the "locks" of the program and individually unlock the collection items onto the hard drive 32 using dual-encryption code technology. More particularly, the program contains the complete set of encryption/decryption algorithms or "private keys" as shown in FIGS. 2 and 3 generally at 70, and the floppy contains a complementary set of encryption/decryption algorithms or "public keys", as shown generally at 72. (See U.S. Pat. Nos. 5,442,706 to Kung and 5,343,527 to Moore). The public and private keys 70, 72 are combined shown generally at 74 via standard multimedia computer equipment as depicted in FIG. 1 to unlock the private media and lock the public media This is accomplished via an encryption/decryption algorithm which allows the user to effectively unlock media on the optical storage drive 52 and lock the media on the floppy disks 56, 58, 60.

Figure 4:
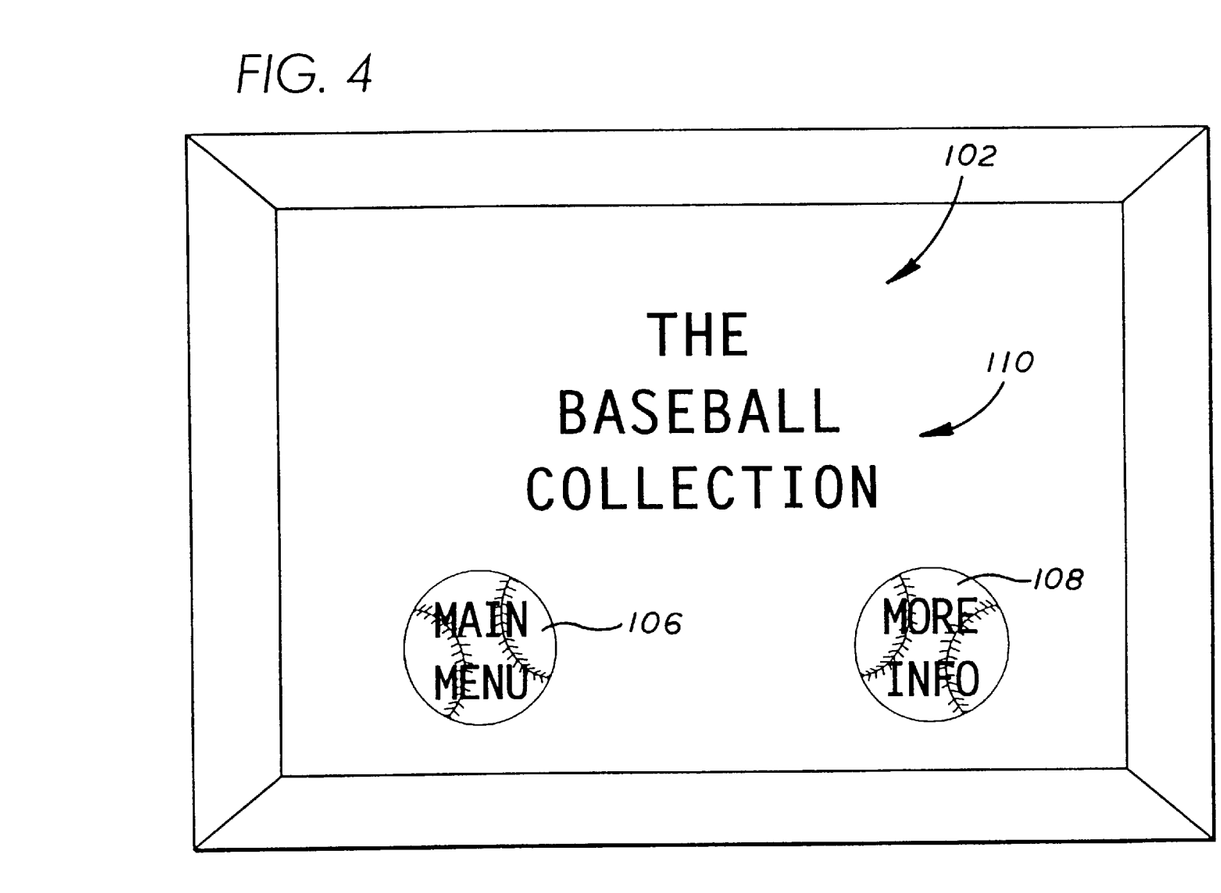
FIG. 4 is a first screen display of the present invention on the monitor shown in FIG. 1.
Figure 5:
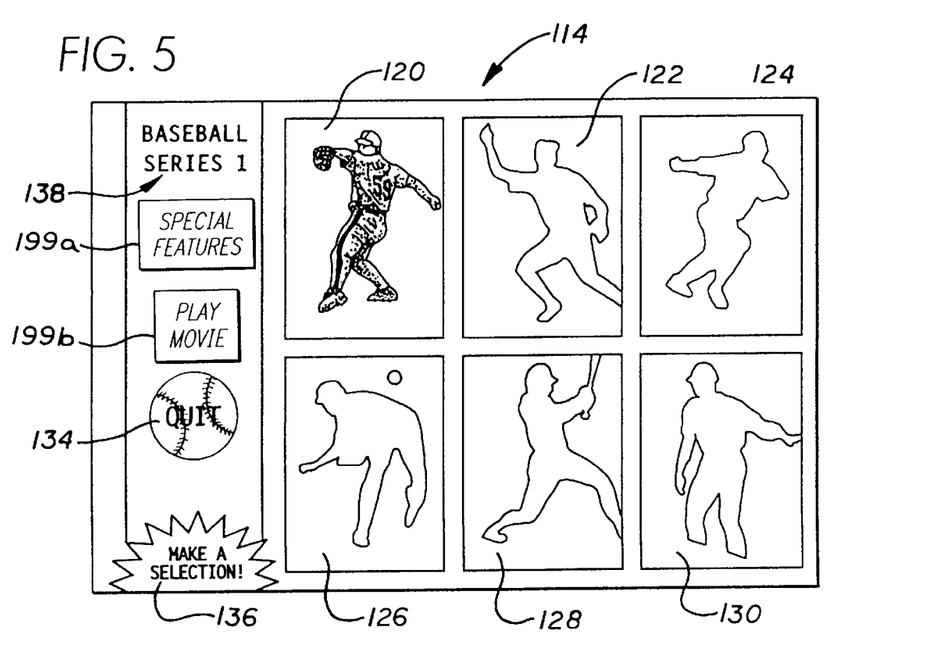
FIG. 5 is a second screen display.
Figure 6:
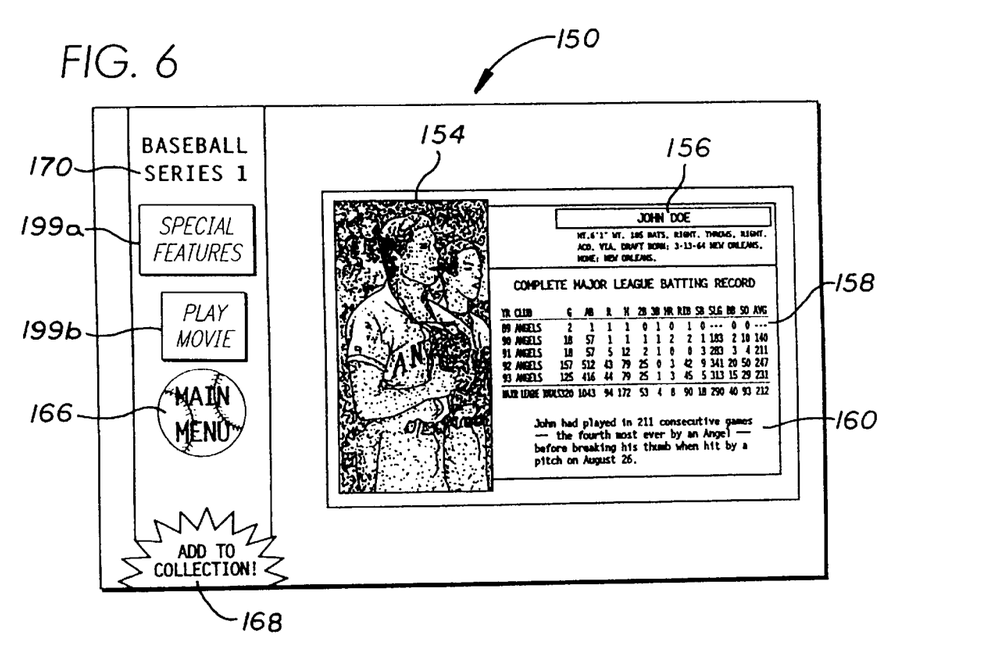
FIG. 6 is a third screen display.
Figure 9:
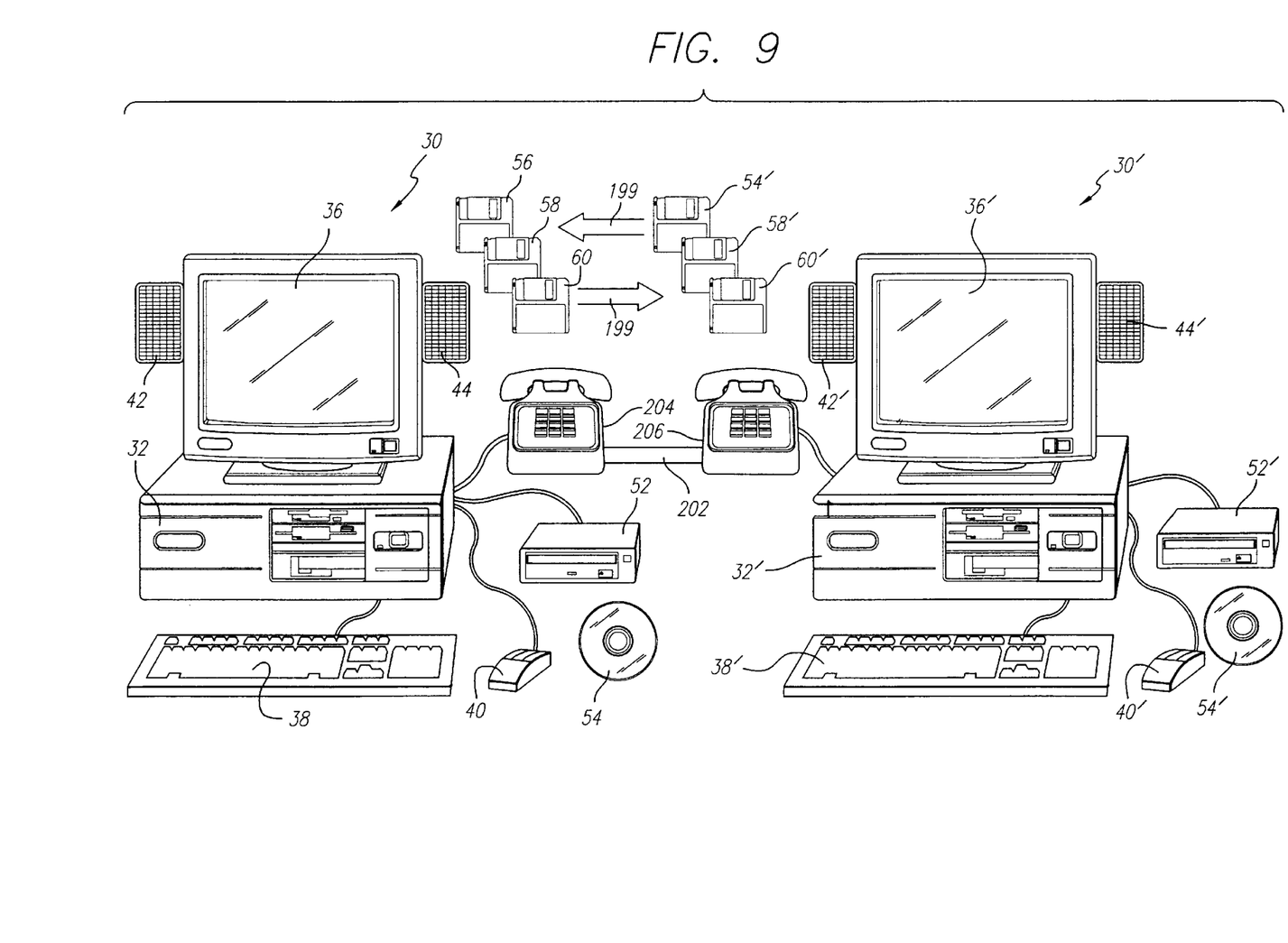
FIG. 9 is a schematic diagram of an alternative system of the present invention.

The system (30) is operated (or the game is played) referring to FIG. 2 as follows:

(1) the portable optical storage program is loaded onto the optical storage disc drive 52 by inserting the disk 54 into the drive in a conventional manner; at this time all of the collection items are locked relative to the hard drive 32;

(2) the user acquires a (3½") floppy disk 56 having a floppy disk program including at least one of the coded keys 72 (for unlocking the corresponding collection item(s)) and inserts it into the disk drive 34 as shown in the flow chart by step 80, and the disk appears on the desktop of the monitor 36, as shown by step 84;

(3) using the mouse 40 the user clicks twice to open the disk and reveal the program icon, as shown by step 88, and double clicks on the program icon to launch the application, as shown by step 92;

(4) alternatively, pursuant to another method, the floppy disk 56 instantly mounts and launches into an audio (via the speakers 42, 44) and visual (via the display monitor 36) opening presentation beginning with opening credits and resolving into an opening main screen display, as shown by step 100; the main screen 102 has "Main Menu" and "More Info" buttons 106, 108 which are depicted in FIG. 4;

(5) clicking on the "More Info" button 108 reveals a screen (not separately shown in the drawings) with explanatory information, and alternatively clicking on the "Main Menu" button 106 produces the graphical icon display, as shown in FIG. 5 generally at 114, and having the six graphical icons 120, 122, 124, 126, 128, 130 (the six trading cards), a "Quit" button 134, a flashing "Make a Selection" message 136 and a title 138; this is shown by step 142 in FIG. 2;

(6) clicking on the Quit button 134, quits the application as shown by step 144 and results in an exit audio/visual display as shown by step 146;

(7) instead of step (6), clicking on the desired icon (trading card), as shown by step 148, produces the display 150 of FIG. 6, which is an enlarged view of the back side of that card with another picture 154 of the player, his name 156, his statistics 158 and a brief bio 160; alternatively, or in addition to the picture, name, statistics, etc., an audio/visual presentation can be presented following the clicking on buttons 120, 122, 124, 126, 128 or 130; the display 150 also includes a "Main Menu" button 166 (which when clicked on takes the user back to display 114 of FIG. 5), an "Add to Collection" button 168 and a title 170; the appearance of display 150 can be accompanied with an audio and/or audio/visual display as shown by step 180;

(8) clicking on the relevant button such as the "Add to Collection" button 168, as shown by step 184, activates the unique code (or encryption/decryption algorithm) for that graphical icon (or trading card or collection item) as shown by step 188, and unlocks the first collection item from the floppy disk on to the hard drive 32; in other words, before clicking on the "Add to Collection" button 168, the portable optical storage program had not been accessed or even need be present; rather, the user can enjoy the audio and visual presentations of the screens 114 and 150 of FIGS. 5 and 6 simply through the programs on the floppies 56 (58, 60) when loaded into the computer;

(9) as the first collection item (120) is unlocked from the floppy disk into the hard drive 32, the first coded key 74 on the floppy 56 is rendered inoperative; that is, it is incapable of unlocking a corresponding first collection item in a similar optical storage program; in the display 114 of FIG. 5 it is dimmed, as shown by the other five graphical icons;

(10) after step (9), by clicking on the dimmed icon button, the first collection item can be "transferred" back to the first floppy 56, as for example when the user wants to trade (or sell) the first collection item (or more specifically the first coded key, etc.) with another person; when it is transferred back, the first collection item is (re)locked relative to the hard drive 32 and the first coded key (74) is rendered operative, using the encryption/decryption code, and goes from dim to bright as in the display of FIG. 5; instead of transferring it back to that specific first floppy 56, it can be transferred to another floppy, such as 58 or 60, which has a similar inoperative first coded key; all subsequent steps outlined below will presume that the first collection item has not been relocked;

(11) other collection items are unlocked as desired using other corresponding coded keys on the first floppy disk 56 and the first floppy disk removed from the disk drive 34;

(12) second, third and so forth floppy disks (58, 60) are inserted in the disk drive 34, and further collection items unlocked using the coded keys thereon, as available and desired;

(13) the portable optical storage program includes an interactive game 194 (see U.S. Pat. No. 5,411,258 to Wilson et al.), which can only be played after all or one or more specific subsets of the collection items have been unlocked as shown by the key library 196; that is and referring to FIGS. 2 and 3, all of the library keys 196 have been collected; to access this game, the portable optical storage disc has its own interface which when presently mounted on the computer system shows a tally of the keys collected and the remaining keys to be collected before the game is activated; the user double clicks on the portable optical storage icon or it mounts instantly, revealing a main screen which shows the tally and remaining keys; when the remaining keys have been collected an additional interface becomes active which allows access to the supporting interactive game within the collection series; the program can contain a number of games accessed when different collections, subsets or libraries of keys 196 have been collected or collection items unlocked;

(14) after playing the game 194, the user clicks on a quit button of that screen to return to the main screen 102, as shown by step 198, or return to their collection; and (15) thereafter, other collection items can be unlocked or transferred back as described above, other games played as the program permits, and/or collection items (or their coded keys) traded with others by trading the floppy disks containing them (as shown in FIG. 9) by arrows 199.

In other words, when a disk 56 is inserted into the floppy disk drive 34, the information contained on the disk can be viewed but the software locked thereto cannot be removed or copied. The user must click (step 146) on the chosen cards (graphical icons) (120) to send their unique unlock code/key 74 to the companion optical storage media 72. That card is then dimmed (locked or rendered inoperative) on the floppy 56 as shown in FIG. 5 and lit (unlocked) on the portable optical storage program. A preferences file is created and housed on the hard drive 32, hidden within the system folder. This file tells the optical storage media drive which keys have been collected and which icons are effectively unlocked.

An alternative embodiment includes after selecting "Main Menu" 106, the user being presented with a list of choices as shown in FIG. 5 including a "Special Features" button 199a and a "Play Movie" button 199b. By clicking on "Special Features" button 199a, user is presented with a subsequent screen (not shown). This screen presents additional information related to the collectible or the game such as audio/visual presentation, text information, web site links or secreted information ("Easter Eggs"). Clicking on the "Play Movie" button 199b causes a movie or other audio/visual presentation stored on the optical storage disc to be played.

Referring to FIG. 3, the encryption/decryption system controls access to media assets. By controlling access, a game can be made of the acquisition and trading of access keys and the access to the media files. By collecting keys 196, media is unlocked on the system. Possibilities are available for having nested keys that once having been gathered can provide a composite key that will allow access to alternate media files or collector bonuses and allow for multi-stage collectible experiences.

More specifically, access keys are stored in two portions—one on a master medium element, such as a portable optical storage medium 72, and the other on copy-protected floppy diskettes 56. Both keys are required to unlock a medium file 74. A lock may be moved from the floppy disk 56 to a table on a hard disk drive 32 or network server. The process physically removes the key portion from the floppy diskette 56 and places that encrypted key into the table 196, which is normally filled with encrypted dummy keys. The actual keys are hashed into the table using a proprietary algorithm. Also part of the key is based upon a defect table held in the FAT (File Allocation Table) of the floppy 56. This defect is required in order to transfer the key, which is stored in the bad section identified by the floppy defect. As an added protection, the LBE (Logical Block Entry) of the bad sector of the floppy 56 also is part of the key. Once the portable optical storage medium public key 72 is matched with the floppy private key 74, the media asset becomes active and accessible.

Once keys are placed in the table they allow decryption of the media using PGP (pretty good protection) or a similar dual drive 34 key encryption system. The keys 72 on the portable optical storage media 72 work with a number of similar keys 74 placed on the floppies. In this way each floppy 56, even for the same media file, will have a unique key. The keys may be transferred to the original floppies 56 and removed from the hard disk 32. This process only allows original floppies to be used for removal of codes as the key is specific to that floppy.

Various prior art encryption systems for different uses are disclosed in U.S. Pat. Nos. 5,237,610 (Gammie et al.), 5,319,705 (Halter et al.), 5,343,524 (Mu et al.), 5,379,433 (Yamagishi), 5,412,717 (Fischer), 5,412,718 (Narasemhalu et al.), 5,416,850 (Cane et al.) and 5,440,631 (Akiyama et al.).

A description of a preferred baseball interactive game 194 and its various steps and options follows. Each Baseball Series disk contains statistical information that is unique to the baseball personality contained on the floppy card. This unique statistical information effects how that player performs in a typical baseball game (i.e., average RBI's, Batting averages, home runs, and so forth). The entire Baseball Game is contained on the companion portable optical storage medium and the players are available to the user only as they have been collected via the floppies. Any player collected on a card may be added to a team file by clicking the "Add to Collection" button. Then via the dual encryption algorithm become available for play. Conversely, a player may be returned to the floppy and encrypted on the portable optical storage media, thus making them available for trading with a friend. This key collection becomes a user's personalized All Star team assembled and played against the computer portable optical storage media baseball game or with another collector's team via the on-line version of the game. The trading card game is enhanced when a companion portable optical storage media is used to facilitate the collection, allowing the players to compete. It is not necessary to have the portable optical storage media to participate in a collection series of baseball cards, as they may be viewed and collected as they appear on the floppy.

The interactive game 194 can be played by the user alone or on-line with another computer system shown generally at 200 having a similar portable optical storage media program, as depicted in FIG. 9. Shown therein is the computer system of FIG. 1 and another similar computer system shown generally at 30' operatively connected together via a telephone line 202 and telephone modems 204 and 206 (see U.S. Pat. No 5,273,288 to Teshima et al.). Instead of telephonic links, the connection between the computers can be any other available method, such as coaxial cable, fiber optics or wireless transmissions. Components of system 30' corresponding to those of system 30 are assigned the same reference numeral followed by a prime designation.

Preferred collectible items of this invention are baseball cards, as previously described in detail. Of course, other items can be adapted and collected, such as "cards" for other sports figures, for actors and actresses, or for historical figures. For example, one embodiment can be an educational game where the users collect and learn about former United States Presidents. Another educational game can comprise collecting former generals and admirals (possibly together with various weapon systems) and the interactive game could reenact famous battles, using the collected soldiers and weapons, either against the computer or on-line (See FIG. 9) against a fellow collector.

Another collection game 194 involves collecting "monster parts" and assembling them with different attributes or powers. One of the monster parts (or collection items) could be an "essence" card (or "live force vial") which is the part needed to bring the assembled monster to life. The "essence" cards could be the more rare, that is, provided on fewer floppies (56, 58, 60), and thus more desirable, valuable and tradable. With the monster assembled and brought to life and the interactive game actuated, the player's (good) monster can be pitted against the game's (evil) monsters created by an evil doctor. The object of the game would be to access the evil doctor's laboratory and shut off the power. To help the user prevail some of the items collected from floppies can be "weapons," such as monster stitch desolver, iodine revealer for revealing invisible evil monsters, gauze bandages for tying them up, golden daggers or things to increase the (good) monster's fighting capabilities such as invisibility cartridges or power bolts providing flying powers.

An adult version of the present collection system can be a take-off of the old video arcade peepshows, with the collection items being (pictures of) attractive women. The content played from the floppy using the portable optical storage media game itself can be audio/visual displays of the collected ladies performing a striptease.

The Multimedia PC Marketing Council, Inc. has developed a second-level multimedia computer specification to encourage the adoption of enhanced multimedia capabilities.

This specification is a backwardly compatible superset of the MPC Level 1 Specification, which continues in effect. This Specification defines the minimum system functionality for Level 2 compliance but is not intended as a recommendation for a particular system configuration. The following minimum Multimedia PC Level 2 System requirements are applicable to the present invention:

I. Hardware:

133 MH Pentium or compatible microprocessor

Eight megabytes of RAM (Eight megabytes recommended)

3.5" Floppy drive

Hard drive (160 MB minimum)

PCI Bus Master

PCI Video Card that supports Direct X (Direct Draw) at 16 bit color

Two button mouse 101 key Keyboard (or functional equivalent)

Optical storage drive backwards compatible to CD ROM and

CD Audio

Double-speed with CD-DA outputs (Capable of sustained 300 KB/sec transfer rate)

No more than 40% of the CPU bandwidth may be consumed when maintaining a sustained transfer rate of 150 KB/sec     Average seek time of 400 milliseconds or less 10,000 hours MTBF     CD-ROM XA ready (mode 1 capable, mode 2 form 1 capable, mode 2 form 2 capable)

Multisession capable

MSCDEX 2.2 driver or equivalent that implements the extended audio APIs     Subchannel Q support (P, R-W optional)

Audio board:

16-bit DAC, Linear PCM sampling; 44.1, 22.05, and 11.025 kHz rate,     DMA/FIFO buffered transfer capability     16-bit ADC, Linear PCM sampling; 44.1, 22.05, and 11.025 kHz rate,     DMA/FIFO buffered transfer capability; microphone input     Music synthesizer     On-board analog audio mixing capabilities     CD-ROM XA audio capability is recommended     Support for the ImA adopted ADPCM software algorithm is recommended Serial port Parallel port MIDI I/O port Joystick port Headphones or speakers connected to the computer system Air Mouse (which is a mouse that connects to a computer via an optical light beam without any physical connection to the computer)

II. System Software:

Binary compatibility with Windows 3.0 plus Multimedia Extensions or Windows 3.1.

Optical Storage Sound Card Audio Cable Standard for MPC Components—Same cable standard as Level 1 (full systems upgrade kits are not required to observe this specification).

Figure 8:
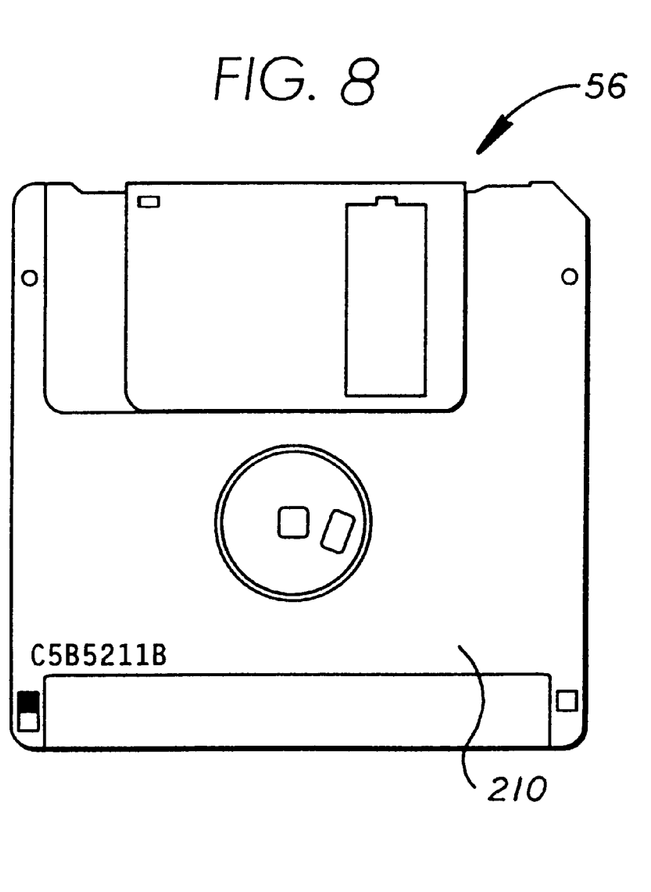
FIG. 8 is a rear view of the disk of FIG. 7.

To deter copying (in the event the algorithm codes are uncovered) the houses or cases 210 of the floppies 56 are themselves made unique. As shown in FIG. 7, each has a hologram 212 affixed thereto by adhesive and unique artwork with product names 214 on the front side and a unique serial number 216 printed on the back side as shown in FIG. 8. Thus, to have the "bootleg" floppy identical to the genuine one, not only would the code keys and programs need to be discovered and copied but also the hologram and serial number. Maximum collectibility, resale value and protection of contents are thereby enhanced.

The floppy disks can be purchased through retail outlets or acquired by trading with fellow collectors, or by an Internet download. Alternatively, the collector inserts a plain floppy disk into a kiosk assembly (not shown) which transforms it into a disk usable herein, that is, with the program and coded keys. He/She can choose on the kiosk screen via a main menu the coded keys to be added, or it can be a random selection by the kiosk assembly. Preferably, he/she would first purchase a blank disk with the hologram and serial number on it. He/She would enter the serial number into the kiosk, insert the disk which would verify the serial number and write the algorithm, protect the disk and give the corresponding software or the software he chooses. Alternatively, at least on a limited use basis, the collectible items can be dowloaded by the collector onto the hard drive from a portable optical storage medium such as DIVEX platform.

A "card" or collection item collected can deposit its key 74 into the system file via the encryption/decryption algorithm to await the addition of the companion portable optical storage media. This takes the chosen key out of circulation and leaves the remaining key (on the floppy disk) for trading purposes. The cards collected individually deposit their key into the system file awaiting the next key in succession to unlock its media. That key can be found on another floppy or the portable optical storage media. Floppy to floppy they are like a string of puzzle pieces, each floppy containing a portion of the entire puzzle. Keys can be collected in any order. The programs can be run disc to disc, floppy to floppy. As the portable optical storage medium increases its storage capacity, this invention can also be portable optical storage to portable optical storage, transferring their keys in the same manner as floppies to portable optical storage media.

The concepts of this invention can be adapted by those skilled in the art for use by equipment other than portable optical storage media—floppy disk computers. Examples of other equipment are game cartridges and recently-commercialized memory cards used with HP laptops for example but having no spinning disk to conserve electricity, or embedded systems (so-called "smart devices" with embedded limited-use computer chips and operating systems).

Referring again to FIG. 1, another feature of the present invention includes communication with the internet or intranet as shown generically at 220 via a network connection show generically at 224 to the computer. The network connection 224 can include a modem, T1 hub or Ethernet card. This allows the collector to download collectible items and enhancements, such as the previously-mentioned weapons, or skill attributes (e.g., enhancing the player's batting average) which would make the collectibles more tradable. This also allows a connection to another player, such as shown in FIG. 9, for trading and game playing.

U.S. Pat. No. 5,434,464 to Terasima et al shows a video entertainment system with a CD ROM and a pair of separate computer systems. U.S. Pat. No. 5,112,051 to Darling et al.

shows an interfacing device for a computer game system. U.S. Pat. No. 4,905,280 to Wiedemer shows a per person use system with video game programming.

From the foregoing detailed description, it will be evident that there are a number of changes, adaptations and modifications of the present invention which come within the province of those skilled in the art. However, it is intended that all such variations not departing from the spirit of the invention be considered as within the scope thereof as limited solely by the claims appended hereto.

What is claimed is:

1. A computer-based collection system, comprising:
   a computer system including a floppy disk drive, a hard drive, an optical storage drive, a user input and a display system;
   a program loaded into said computer system by an optical storage disc into said optical storage drive, said program including different locked first and second collection items;
   a first disk having a first coded key, said first disk after being inserted into said disk drive being capable of unlocking, using said first coded key, said first collection item into said hard drive; and
   a second disk having a second coded key, said second disk after being inserted into said disk drive being capable of unlocking, using said second coded key, said second collection item into said hard drive;
   wherein said first coded key after unlocking said first collection item is rendered inoperative and incapable of unlocking a corresponding first collection item in a similar program.

2. The collection system of claim 1 wherein said program is capable, by actuation of said user input, after said first collection item has been unlocked into said hard drive, of relocking said first collection item relative to said hard drive and rendering said first coded key of said first disk operative and capable of again unlocking said first collection item.

3. The collection system of claim 2 wherein said first disk with said first coded key operative allows said first collection item to be fully displayed on said display system and said first disk with said first coded key inoperative is incapable of fully displaying said first collection item on said display system.

4. The collection system of claim 3 wherein said first collection item when prevented from being fully displayed is displayed with visually dimmer display than when fully displayed.

5. The collection system of claim 4 wherein said computer system, said optical storage drive and said hard drive define, respectively, a first computer system, a first optical storage drive and a first hard drive; and further comprising a second computer system including a second disk drive, a second hard drive, a second optical storage drive, a second user input, and a second display system, a second program similar to said first program and in said second computer system, and wherein said first disk with said first coded key having been rendered operative can be inserted into said second disk drive to unlock using said first coded key a similar first collection item into said second hard drive.

6. The collection system of claim 1 wherein said second coded key after unlocking said second collection piece is rendered inoperative and incapable of unlocking a similar second collection piece in a similar program.

7. The collection system of claim 1 wherein said user input includes an infrared air mouse.

8. The collection system of claim 1 wherein said first disk includes a first disk program, which includes said first coded key, and which when activated initiates a display, separate from said portable optical storage media program, on said display system, said display being associated with said first collection item.

9. The collection system of claim 1 wherein said program includes a locked third collection item different from said first and second collection items, and said first disk includes a third coded key adapted to unlock said third collection item into said hard drive.

10. The collection system of claim 1 wherein said first disk includes an identifier on its disk case.

11. The collection system of claim 10 wherein said identifier is a hologram.

12. The collection system of claim 10 wherein said second disk includes a different identifier, different from said identifier of said first disk, on its disk case.

13. The collection system of claim 12 wherein said identifier and said different identifier comprise different serial numbers.

14. The collection system of claim 1 wherein said first and second items form part of a larger set of collection items included in said program.

15. The collection system of claim 1 wherein said user input includes a mouse and a keyboard both operatively connected to said hard drive.

16. The collection system of claim 1 wherein said display system includes a visual display monitor and at least one audio speaker, both operatively connected to said hard drive.

17. The collection system of claim 1 wherein said program includes first and second encryption/decryption algorithms corresponding to said first and second collection items, said first coded key is associated with a complementary first encryption/decryption complementary algorithm to said first encryption/decryption algorithm, and said second coded key is associated with a complementary second encryption/decryption complementary algorithm to said second encryption/decryption algorithm.

18. The collection system of claim 1 wherein said program includes an interactive computer game which a user can play using said user input only after said first and second collection items have been unlocked into said hard drive.

19. The collection system of claim 1 wherein said first disk includes a third coded key, and further comprising a third disk containing said third coded key but not said first and second coded keys.

20. The collection system of claim 1 wherein said computer system includes network connectivity providing communication with at least one other computer.

21. A computer-based collection system, comprising:
   a smart device with an embedded system, said smart device having network connectivity;
   an optical storage drive;
   a disk drive;
   a program loaded into said smart device by an optical storage disc inserted into said optical storage drive;
   said program including different locked first and second collection items;
   a first disk having a first coded key, said first disk after being inserted into said disk drive being capable of unlocking, using said first coded key, said first collection item into said smart device; and
   a second disk having a second coded key, said second disk after being inserted into said disk drive being capable of unlocking, using said second coded key, said second collection item into said smart device;
   wherein said first coded key after unlocking said first collection piece is rendered inoperative and incapable of unlocking a corresponding first collection item in a similar program.

22. The collection system of claim 21 wherein said network connectivity is via a modem, T1 Hub or Ethernet card.

23. The collection system of 21 wherein collection items and/or enhancements can be downloaded via said network connectivity.

24. A computer-based collection method, comprising the steps of:

provided a computer system including a disk drive, a hard drive, an optical storage drive, a user input and a display system;

providing a program loaded into said drive, the program including different locked first and second collection items;

providing first and second disks having respective first and second coded keys;

inserting the first disk into the disk drive;

instructing the computer system via the user input to unlock the first collection item into the hard drive using the first coded key of the inserted first disk;

inserting the second disk into the disk drive; and instructing the computer system via the user input to unlock the second collection item into the hard drive using the second coded key of the inserted second disk.

25. The collection method of claim 24 wherein the program includes an interactive computer game which game can be played only after a specified series of collection items, including at least the first and second collection items, have been unlocked into the hard drive using respective coded keys contained on disks; and playing the computer game using the user input.

26. The collection method of claim 25 wherein said playing includes playing the computer game networked with another player.

27. The collection method of claim 25 further comprising inserting a third disk having therein a coded key into the disk drive; viewing on the display system a collection item associated with the coded key of the third disk; and without rendering the coded key inoperative, removing the third disk from the disk drive and trading it with another person for at least a fourth disk having a coded key therein.

28. The collection method of claim 24 wherein said first-mentioned instructing step renders the first coded key inoperative and incapable of unlocking a similar first collection piece in a similar program.

29. The collection method of claim 28 further comprising after said first-mentioned instructing step, removing the first disk from the disk drive, and thereafter inserting a disk having an inoperative first coded key into the disk drive, and instructing the computer system to relock the first collection item and render the inoperative first coded key operative and capable of subsequently unlocking the first collection item.

30. The collection method of claim 29 further comprising after said rendering the first coded key operative, inserting the disk into a different computer system and unlocking a corresponding first collection item therein.

31. The collection method of claim 24 further comprising after said second-mentioned instructing step, displaying the first and second collection items on the display system.

32. The collection method of claim 24 wherein said first-mentioned instructing step renders the first coded key inoperative and incapable of unlocking a similar first collection piece in a similar program.

33. The collection method of claim 24 wherein said instructing steps use asymmetric encryption keys.

34. The collection method of claim 24 wherein the optical storage drive is a DVD ROM drive and the program is a DVD ROM program.

* * * * *